US008034139B2

(12) United States Patent
Ikeno et al.

(10) Patent No.: US 8,034,139 B2
(45) Date of Patent: Oct. 11, 2011

(54) CARTRIDGE ELEMENT FOR A DUST COLLECTOR

(75) Inventors: Hidenori Ikeno, Toyokawa (JP);
Hiroaki Watanabe, Toyokawa (JP);
Kazuhiko Kitahora, Toyokawa (JP)

(73) Assignee: Sintokogio, Ltd., Aichi-Ken (JP)

( * ) Notice: Subject to any disclaimer, the term of this patent is extended or adjusted under 35 U.S.C. 154(b) by 210 days.

(21) Appl. No.: 12/318,738

(22) Filed: Jan. 7, 2009

(65) Prior Publication Data

US 2009/0211209 A1    Aug. 27, 2009

Related U.S. Application Data

(62) Division of application No. 10/583,347, filed as application No. PCT/JP2004/018648 on Dec. 14, 2004, now abandoned.

(30) Foreign Application Priority Data

| Dec. 19, 2003 | (JP) | 2003-421727 |
| Dec. 26, 2003 | (JP) | 2003-432955 |
| Apr. 14, 2004 | (JP) | 2004-118854 |
| Apr. 16, 2004 | (JP) | 2004-120975 |
| Apr. 22, 2004 | (JP) | 2004-126348 |

(51) Int. Cl.
*B01D 46/04* (2006.01)
(52) U.S. Cl. ............................. 55/302; 55/341.1; 55/484
(58) Field of Classification Search .................. 55/302, 55/341.1, 341.7; 95/280
See application file for complete search history.

(56) References Cited

U.S. PATENT DOCUMENTS

| 1,521,576 | A |   | 12/1924 | Wittemeir |
| 1,841,250 | A |   | 1/1932 | Merryweather |
| 2,547,597 | A |   | 4/1951 | Roggero |
| 2,565,845 | A |   | 8/1951 | Frederick |
| 2,695,831 | A |   | 11/1954 | Sigal |
| 2,853,153 | A |   | 9/1958 | Sexton |
| 3,421,295 | A | * | 1/1969 | Swift et al. ...................... 55/302 |
| 3,496,704 | A |   | 2/1970 | Bandlow |
| 3,535,851 | A | * | 10/1970 | Riemsloh ........................ 55/294 |
| 3,593,503 | A |   | 7/1971 | Andrews |
| 3,627,398 | A |   | 12/1971 | Reese |
| 3,722,973 | A |   | 3/1973 | Textoris |
| 3,830,042 | A |   | 8/1974 | MacDonnell |
| 3,883,330 | A | * | 5/1975 | Margraf ...................... 55/341.1 |
| 3,884,657 | A | * | 5/1975 | Rebours et al. ................ 55/293 |
| 3,937,531 | A |   | 2/1976 | Hagen et al. |
| 3,954,426 | A | * | 5/1976 | Brange ........................... 95/280 |

(Continued)

FOREIGN PATENT DOCUMENTS

JP          58-132524          9/1983

(Continued)

*Primary Examiner* — Duane Smith
*Assistant Examiner* — Anthony Shumate
(74) *Attorney, Agent, or Firm* — Finnegan, Henderson, Farabow, Garrett & Dunner, L.L.P.

(57) ABSTRACT

A dust collector using a cartridge element, downsized, capable of effectively performing brushing away, and simple in structure and handling. The cartridge element has a flat plate shape as a whole, and is constituted of a flat filter (1) made from a sheet-like filtration material pleated and formed into a tubular shape, a cap (2) and an upper end member (3) that hold openings, perpendicular to the fold lines of the pleats, in a flat plate shape, and a reinforcement member (4) that is a resin pipe or round bar provided laterally across the flat filter (1). All parts used are of a burnable resin.

3 Claims, 15 Drawing Sheets

U.S. PATENT DOCUMENTS

| | | | | |
|---|---|---|---|---|
| 4,227,903 | A | * | 10/1980 | Gustavsson et al. ............ 55/302 |
| 4,364,751 | A | * | 12/1982 | Copley ............................ 95/280 |
| 4,395,269 | A | * | 7/1983 | Schuler ........................... 55/302 |
| 4,409,009 | A | * | 10/1983 | Lissy ............................... 55/302 |
| 4,445,913 | A | * | 5/1984 | Nishiyama ...................... 55/302 |
| 4,472,184 | A | | 9/1984 | Neumann et al. |
| 4,481,017 | A | * | 11/1984 | Furlong ............................ 95/74 |
| 4,525,184 | A | * | 6/1985 | Tassicker ........................ 55/302 |
| 4,661,131 | A | * | 4/1987 | Howeth ........................... 55/302 |
| 4,701,196 | A | | 10/1987 | Delany |
| 4,730,454 | A | * | 3/1988 | Pischinger et al. ............. 60/274 |
| 4,746,339 | A | | 5/1988 | Millard |
| 5,156,660 | A | | 10/1992 | Wilson |
| 5,757,109 | A | | 5/1998 | Parvin |
| 6,613,115 | B2 | | 9/2003 | Moore |
| 2002/0112458 | A1 | | 8/2002 | Schneider et al. |
| 2004/0144253 | A1 | * | 7/2004 | Gillingham et al. ............ 95/280 |
| 2004/0187689 | A1 | * | 9/2004 | Sporre et al. .................... 95/280 |

FOREIGN PATENT DOCUMENTS

| | | |
|---|---|---|
| JP | 61-192320 | 8/1986 |
| JP | 6-85016 | 12/1994 |
| JP | 7-3713 | 1/1995 |
| JP | 7-31820 | 2/1995 |
| JP | 2001-269528 | 10/2001 |
| JP | 2001-300237 | 10/2001 |

* cited by examiner (a)

(b)

(a)　　　　　　　　　　(b)

(a)　　　　　　　　　　(b)

(a)

(b)

(a)

(b)

(a)

(b)

(a)

(b)

CARTRIDGE ELEMENT FOR A DUST COLLECTOR

This application is a divisional of U.S. application Ser. No. 10/583,347 filed Jun. 19, 2006 now abandoned, which is a §371 of International application No. PCT/JP2004/018648 filed Dec. 14, 2004, which claims priority of Japanese applications No. 2003-421727, filed Dec. 19, 2003; No. 2003-432955, filed Dec. 26, 2003; No. 2004-118854, filed Apr. 14, 2004; No. 2004-120975, filed Apr. 16, 2004; and No. 2004-126348 filed Apr. 22, 2004, the contents of all of which are incorporated herein by reference.

FIELD OF THE INVENTION

The present invention relates to a cartridge element for a dust collector, a mechanism to attach and detach the cartridge element, and a dust collector using the cartridge element.

DESCRIPTION OF THE PRIOR ART

A cylindrical cartridge element used in a dust collector is in the public domain (e.g., see Japanese Patent Laid-open Publication No. 2001-269528, FIG. 1). However, the cylindrical cartridge elements made many open spaces when they were installed in a dust collector, and so it was a problem in that the rate of the use of the space by the cartridge elements was low.

A conventional method for attaching cartridge elements to a dust collector is to provide a flange at one end of each cartridge element and to fix each flange by bolts to the dust collector with a packing (e.g., see Japanese Utility-Model Laid-open Publication No. S58-132534, FIG. 3).

However, the method for attaching as described in Japanese Utility-Model. Laid-open Publication No. S58-132524 has a problem in that the method may not tightly seal the flange if the pitch of the bolting is great. Therefore, many bolts are needed to fix the flange and seal it tightly. Accordingly, the method has a problem in that the work for fixing takes a long time, and the cost of manufacturing the dust collector is also high. Even when bolts are not used for fixing the flange, so as to ensure a sufficient airtightness, it has a problem in that the cost of manufacturing is great because a flange with a complicated shape may be needed, or an external force (e.g., an air cylinder, an electric motor, etc.) may need to be used.

A cylindrical cartridge element that is made by inserting a pleated filter medium between outer and inner containers that are cylindrical is in the public domain, and the dust collector using this element is also in the public domain (e.g., see Japanese Patent Laid-open Publication No. 2001-300237, page 1, FIGS. 1-6).

However, the dust collector that uses the cylindrical cartridge element disclosed in Japanese Patent Laid-open Publication No. 2001-300237 has a problem in that when the elements are installed in the dust collector, since the elements are cylindrical, there exist many spaces between these elements, and so the rate of the use of the space by the elements is low. Since many of the elements are needed, if the rate of the use of the space by the collector is low, the dust collector will need to have a wide space, and it will have a problem in that it will need more space to install it when the elements are placed vertically (they can be expanded vertically) as disclosed in Japanese Patent Laid-open Publication No. 2001-300237. To solve this problem, the elements might be placed horizontally (they can be expanded horizontally) and be increased in quantity heightwise. However, in this case, there might be a problem in that the efficiency of filtering could be lowered, because the direction of the pleats of the elements would be at right angles to the direction of the movement of the dust (vertical direction).

A dust collector of a pulse-jet-type that uses conventional cartridge elements is also in the public domain (e.g., see Japanese Utility-Model Laid-open Publication No. H6-85016, page 1, FIGS. 1-7).

The apparatus disclosed in Japanese Utility-Model Laid-open Publication No. H6-85016 has an air-jet nozzle just above each cartridge element, and the air piping from the air-jet nozzle to an air valve is long. Therefore, the longer the air piping is, the greater the pressure loss through the piping becomes. The supply pressure from an air tank must be kept high so that the discharge pressure of the nozzle is kept high enough to disperse the dust. The apparatus has the problem in that the cost of equipment such as that for compressors is higher. Further, when an element is changed, as shown in FIGS. 5 and 7 in Japanese Utility-Model Laid-open Publication No. H6-85016, the work for doing so, including pulling out the container, should be done just above the element. In this case, whenever the filter medium is changed, the air pipes from the air jet nozzle to the air valve must be dismantled, and if the dust collector is large, since they are long, and there are many of them, its working efficiency is not-good and the work takes a very long time. The air piping also receives a great force from impacts, because air at a high pressure and high velocity flows through the piping. Therefore, the piping should be fixed firmly and as far as possible it should not be removed.

This invention is one that can resolve the above problems. It is intended for improving the rate of the use of the space by a cartridge element and reducing the size of a dust collector.

The invention is also intended to provide a mechanism to attach and detach a cartridge element of a dust collector in a short time and to dower the cost of manufacturing.

Further, the invention is intended to provide a dust collector that can improve the rate of the use of the space by a cartridge element, decrease the space to install the dust collector, and improve its efficiency of filtering.

Further, the invention is also intended to provide a dust collector of a pulse-jet-type that can have its filter medium exchanged in a short time as well as to prevent the decrease in the discharge pressure of the air of the pulse jet.

DISCLOSURES OF THE INVENTION

To achieve the above-mentioned objects, the plate-type cartridge element of the invention comprises a planate filter that is composed of two sheets of pleated filter medium being opposed to, and spaced apart from, each other, an upper-end-member attached on the upper end of the planate filter and having an opening for an air outlet that is composed of the planate filter, and a cap attached on the lower end of the planate filter.

The invention comprises a transverse reinforcing material in the planate filter, such as a transverse pipe. The transverse pipe in it can function as a reinforcement.

Further, the transverse pipe in the planate filter can be transversely set between the right and left sides of it.

The transverse pipe or the transverse reinforcing material in the planate filter can disperse any air flowing reversely to disperse the dust during the backwash of it.

Further, there can be just one transverse pipe or transverse reinforcing material in the planate filter. In that case there would be two vertical rods, to support both sides of it, so that they would be shaped like an H.

The transverse pipe or the transverse reinforcing material in the planate filter can be welded to the vertical rods. The upper-end-member-and the cap can be made of resin.

To achieve the above-mentioned objects, the plate-type cartridge element comprises a planate filter that is composed of two sheets of pleated filter medium being opposed to, and spaced apart from, each other, and a reinforcing material that is used by being inserted into the planate filter and removed from it, an upper-end-member being attached on the upper end of the planate filter and having an opening for an air outlet of the planate filter, and a cap being attached on the lower end of the planate filter.

The reinforcing material that is used by being inserted into the planate filter can be equipped with a transverse member.

Further, the transverse pipe fixed on the reinforcing material that is used by being inserted into the planate filter can be set transversely between the right and left sides of the planate filter.

The transverse pipe fixed on the reinforcing material that is used by being inserted into the planate filter can disperse the air to disperse the dust on the planate filter during the backwash of it.

Further, the reinforcing material that is used by being inserted into the planate filter can be a welded structure and made of material having the same stiffness as iron or the like, and the upper-end-member and the cap can be made of resin.

In this invention, as described above, since the cartridge element is a plate-type, the rate of the use of the space by the cartridge elements in a dust collector is increased, and the filtration area of it will be greater than that of a conventional dust collector, if they are the same size, and the dust collector will accordingly be compact.

To achieve the above-mentioned objects, a mechanism to attach and detach a plate-type cartridge element of the dust collector of this invention comprises guiding members that are fixed under the bottom of a duct at intervals and have inclined elliptic holes, rails that are fixed in the guiding members and have connecting holes corresponding to the inclined elliptic holes, coupling devices that couple the guiding members to the rails by penetrating the inclined elliptic holes and the connecting holes, and cartridge elements that are installed between, and supported by, the rails.

Further, a mechanism to attach and detach the plate-type cartridge element of the dust collector of the invention comprises guiding members that are fixed under the bottom of a duct at intervals and have inclined elliptic holes, rails that are fixed in the guiding members and have connecting holes corresponding to the inclined elliptic holes, coupling devices that couple the guiding members to the rails by being inserted through the inclined elliptic holes and the connecting holes, a sliding member that has holes in which the cartridge elements are inserted and that is installed on the rails, and cartridge elements that are inserted in the holes of the sliding member, installed between the rails with the sliding member, and supported by the rails.

A mechanism to attach and detach the plate-type cartridge element of the dust collector of the invention comprises the cartridge elements that are plate-type cartridge elements.

As described above, since the mechanism to attach and detach the plate-type cartridge element of the dust collector of the invention comprises guiding members that are fixed under the bottom of a duct at intervals and have inclined elliptic holes, rails that are fixed in the guiding members and have connecting holes corresponding to the inclined elliptic holes, coupling devices that couple the guiding members to the rails by penetrating the inclined elliptic holes and the connecting holes, and cartridge elements that are installed between the rails and supported by the rails, the invention can have effects such that the cartridge elements can be easily attached and detached in a short time and the cost for manufacturing the dust collector can be decreased.

To achieve the above-mentioned objects, the dust collector of the invention has plate-type cartridge elements. Each comprises a filter that is composed of two sheets of a pleated filter medium being opposed in space, one end of the filter being closed and the other end of it being open. The cartridge elements are installed in the dust collector so that the successive edges, which are shaped the like the ridges of the pleated filter medium, appear to be vertical stripes. The dust collector comprises filtering chambers that are vertically stacked and communicate with each other and communicate with the entrance of air with dust, a duct that communicates with the inside of the filters through the openings of the filters, plate-type cartridge elements that are installed in the filtering chambers and are attached on the duct and can easily be attached and detached, purified-air chambers that communicate with the duct, an air-suctioning means that communicates with the purified-air chambers, and a pulse-jet mechanism that intermittently feeds compressed air inside the filters.

Further, the dust collector of the invention has transverse members inside the filters, and the transverse members disperse the compressed air that is fed during any backwash of the filters.

The dust collector of the invention has plate-type cartridge elements. Each comprises a filter that is composed of two sheets of pleated filter medium being opposed to, and spaced apart from, each other. One end of the filter is closed and the other end of it is open. The cartridge elements are installed in the dust collector so that the successive edges shaped like the ridges of the pleated filter medium appear to be vertical stripes. The dust collector comprises filtering chambers that are stacked and that communicate with each other, ducts that are fixed on the upper part of each of the filtering chambers at intervals and communicate with the inside of the filters through the openings of the filters, plate type cartridge elements that are installed in the filtering chambers and that are attached on the ducts and can easily be attached and detached, purified-air chambers that communicate with the ducts, an air-suctioning means that communicates with the purified-air chambers, a pulse-jet mechanism that intermittently feeds compressed air inside the filters through nozzles that are facing the openings of the ducts, an entry for air with dust that is located on the top of the duct, and that communicates with the highest filtering chamber, and a hopper that communicates with the bottom of the lowest filtering chamber.

Since the dust collector of the invention has plate-type cartridge elements, each of which comprises a filter that is composed of two sheets of pleated filter medium being opposed to, and spaced apart from, each other, one end of the filter being closed and the other end of it being open, the cartridge elements being installed in the dust collector so that the successive edges that are shaped like ridges of the pleated filter medium appear to be vertical stripes, wherein the dust collector comprises filtering-chambers that are stacked and communicate with each other and communicate with the entry of air with dust, a duct that communicates with the inside of the filters through the openings of the filters, plate-type cartridge elements that are installed in the filtering chambers and are attached on the ducts and can easily be attached and detached, purified-air chambers that communicate with the duct, an air-suctioning means that communicates with the purified-air chambers, and a pulse-jet mechanism that intermittently feeds compressed air inside the filters, the invention can achieve effects such that the rate of the use of the space by the cartridge elements can be increased, the installation space for the dust collector can be decreased, and the efficiency of filtering can be increased.

To achieve the above-mentioned objects, the pulse-jet-type dust collector of the invention has a cartridge element that is composed of a filter that has a cylindrical shape, one end of the filter being closed and the other end of it being opened, wherein the dust collector comprises a hollow duct, one end of which is closed and the other end of it is open, the cartridge element being attached on the duct and easily attached and detached, and a pulse-jet mechanism that intermittently feeds compressed air inside the filter.

Further, the pulse-jet-type dust collector of the invention has a plate-type cartridge element.

As stated above, since the pulse-jet-type dust collector of the invention has a cartridge element comprising a filter that has a cylindrical shape, one end of the filter being closed and the other end of it being open, wherein the dust collector comprises a hollow duct, one end of which is closed and the other end of which is open, wherein the cartridge element is attached on the duct and can easily be attached and detached, wherein a pulse-jet mechanism intermittently feeds compressed air inside the filter, the invention can achieve effects such that the drop of the discharge pressure can be restrained and the filter medium can be changed efficiently in a short time.

BRIEF DESCRIPTIONS OF THE DRAWINGS

BEST MODE FOR CARRYING OUT THE INVENTION

Figure 1:
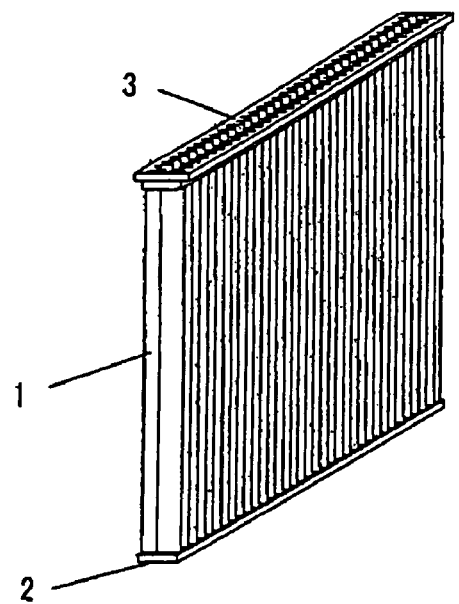
FIG. 1 is an external view of the plate-type-cartridge element.

A. The First Embodiment of the Invention

Now we discuss the embodiment of the plate-type cartridge element of the invention.

The first embodiment can achieve the function discussed above by making a cartridge element into a plate-type element, as follows.

First, the space for the elements in a dust collector can be utilized effectively and the rate of the use of the space by the element can be increased by making the cartridge element into a plate-type element.

The plate-type-cartridge element of this embodiment is one that substantially has the shape of a plane plate when it is installed in a dust collector. The sectional view of it is rectangular. The ratio of the long and short sides of the rectangle is 1:0.08-1:0.15.

"Pleated" of this embodiment denotes being made with a configuration that has cross section in the shape of successive Vs. Any angles of the gradients of the two sides of every V-shape are acceptable. Both of them may be at the same angle or one of them may be vertical.

A pleated planate filter can increase the area to trap dust. It can also increase the efficiency in dispersing the dust during the backwash of the filter, because the pleats of it are alternately expanded and contracted.

Now we discuss the embodiment of the invention, by referring to the drawings.

As shown in FIG. 1, the plate-type cartridge element of this embodiment comprises a planate filter 1 composed of a pleated filter medium, and a cap 2 and an upper-end member 3. The cap 2 and the upper-end member 3 are formed on each end of the planate filter 1.

Figure 2:
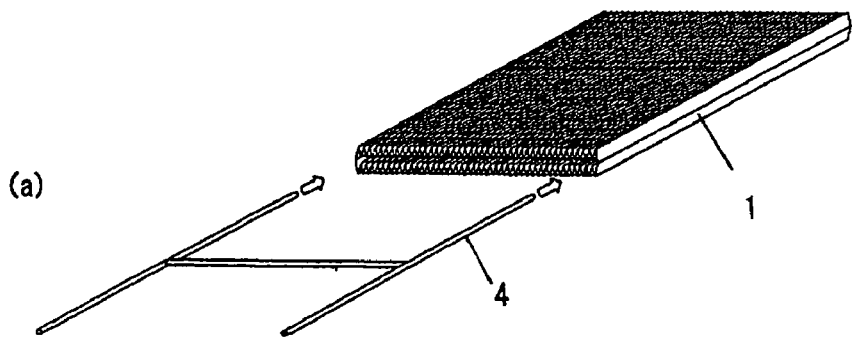
FIG. 2a, is an external view of the planate filter and the reinforcing material.
FIG. 2b is an external view of the reinforcing material that is attachable inside the planate filter and used in it.
Figure 2:
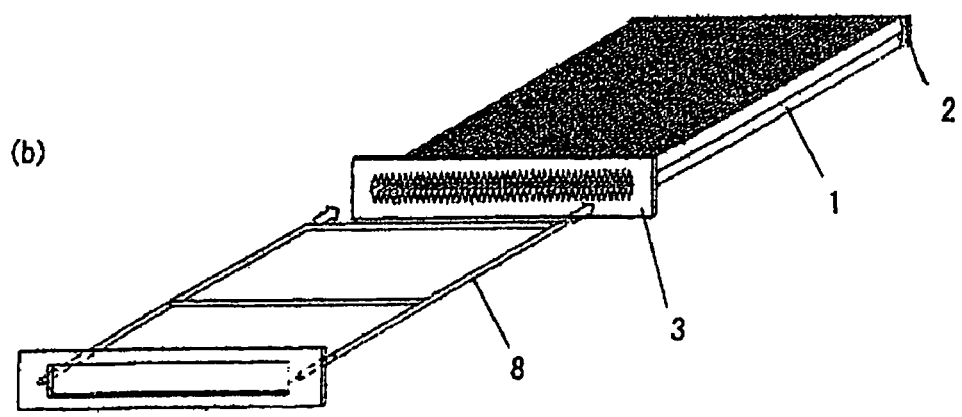

The planate filter 1 is made by adhering both sides of each of the two sheets of the pleated filter medium. The filter forms a substantially flat plate with a cavity. Further, as shown in FIG. 2a, a reinforcing material 4, which is made by pipes or round bars that are made by resin such as ABS, PP, etc., is transversely inserted in the planate filter 1 that forms a substantially flat plate with a cavity.

Figure 3:
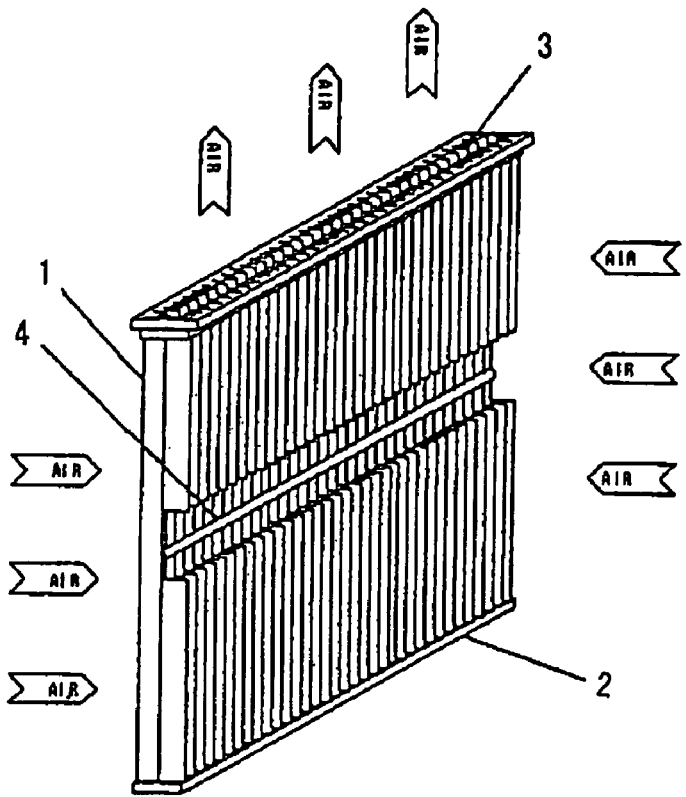
FIG. 3 is a local sectional view showing a process of filtering using the plate-type-cartridge element.
Figure 4:
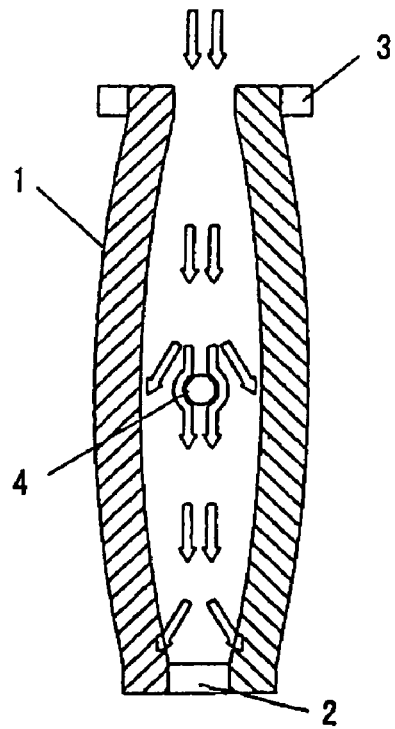
FIG. 4 is an explanatory drawing of the backwash of the filter.

Referring to FIG. 3, we discuss the filtering procedure using the plate-type cartridge element. The air that contains dust that is introduced by a dust collector (not shown) contacts the outer surface of the folds of the planate filter 1, and only the dust adheres to the surface of it. Then the air from which the dust is removed goes through the planate filter 1, goes through holes that are made inside the planate filter 1 and made on the upper-end member 3, and goes out of the dust collector.

The reinforcing material 4 has an effect to prevent the filter from being crushed during filtering. It also effectively disperses pulsed air; because any collision of air with the reinforcing material 4 changes the direction of the flow of the air during the backwash of the filter. Accordingly, it has an effect to let the pulsed air flow all over the planate filter 1. Since the reinforcing material 4 does not adhere to the planate filter 1, the filter is swollen during the backwash, and the effect of dispersing the dust is increased.

Further, material such as urethane or resin that is used for the cap 2 and the upper-end member 3, and a pipe or a round bar made of resin such as ABS or PP does not generate any harmful substance such as dioxin. Accordingly, this can decrease the environmental burden.

In this embodiment, the backwash of the filter means disperses the dust that adheres to the outer surface of the filter by admitting air from the openings of the upper-end member 3 and letting it through the filter from its inside to its outside so as to eliminate the clogging of the filter caused by the dust that has adhered to it.

Figure 5:
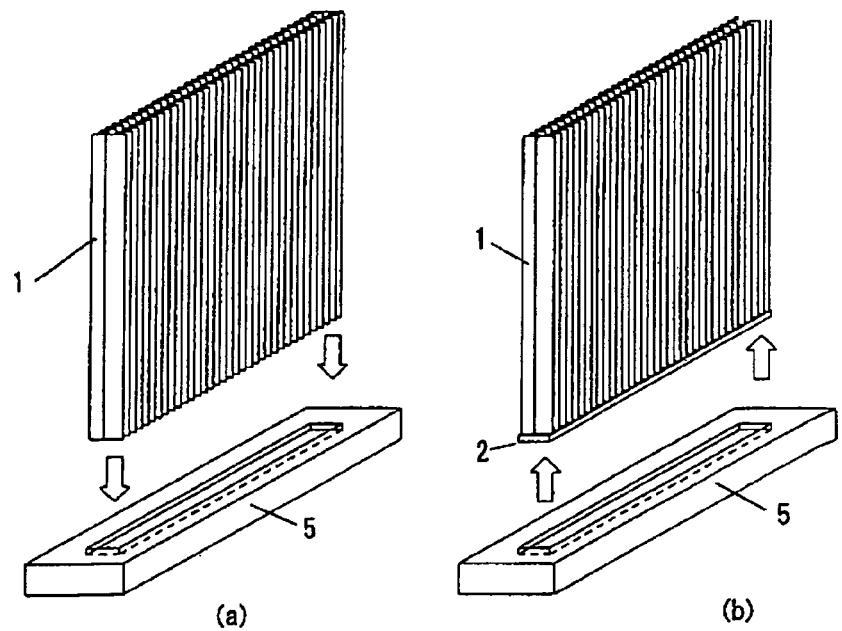
FIG. 5a is an explanatory drawing on how to insert the planate filter in the cap during the construction of the filter.
FIG. 5b is an explanatory drawing on how to remove the planate filter from the cap during the construction of the filter.
Figure 6:
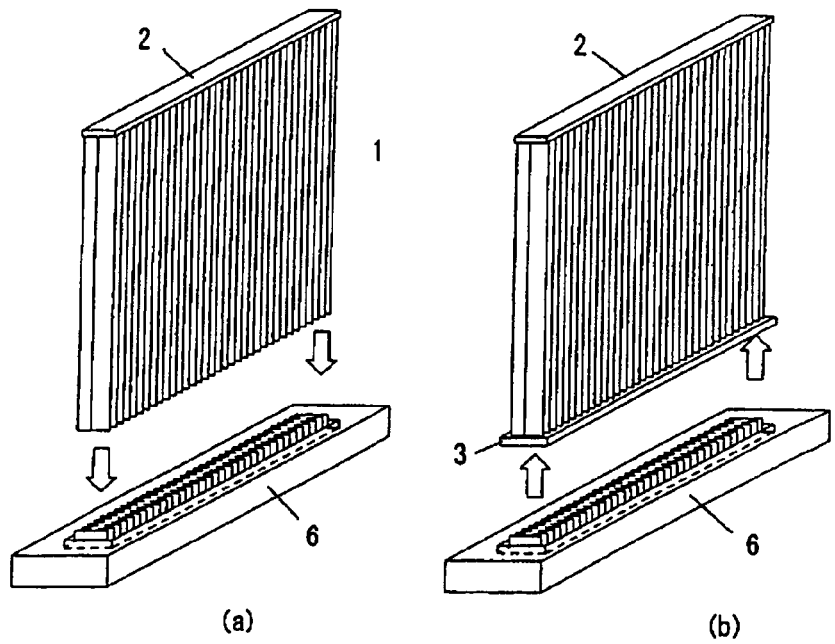
FIG. 6a is an explanatory drawing on how to insert the planate filter in the upper member during the construction of the filter.
FIG. 6b is an explanatory drawing on how to remove the planate filter from the upper member during the construction of the filter.

The plate-type cartridge element is made as follows. The one end of the planate filter 1 that is formed into the substantially flat plate with a cavity is inserted into a molding box 5 of a cap (see FIG. 5*a*), and then a urethane resin in the form of liquid is poured into it and hardens to form the cap 2 (see FIG. 5*b*). Further, a model having the same shape as the internal shape of the substantially flat plate with a cavity 1, which is pleated, is made as a molding box 6 of the upper-end member (see FIG. 6*a*). The other end of the planate filter 1 is put on the molding box 6 of the upper-end member (see FIG. 6*a*), and then a urethane resin in the form of liquid is poured into it. It hardens to form the upper-end member 3 (see FIG. 6*b*). Thus; holes with the same pleated shape as the inside of the planate filter 1, and that communicate with it, are formed on the upper-end member 3:

In this embodiment, a reinforcing material 8 can be removed from the planate filter 1 and be used by inserting it as shown in FIG. 2*b*.

In this case, the reinforcing material 8 that is used in the planate filter 1 is made of material having the same stiffness as iron or the like. The reinforcing material 8 has a part that is shaped like an H. The upper side of it has a transverse member and the other side of it has a flat transverse plate of the same material and the same shape as the upper-end member 3 and has a rectangular opening. It is not necessary to have just one transverse member. Several may be used.

Since the reinforcing material 8 is made of pipes, or the round bars of the material may have the same stiffness as iron or the like, the reinforcing material 8 can be reused even after the planate filter 1 is discarded.

B. The Second Embodiment of the Invention

Figure 7:
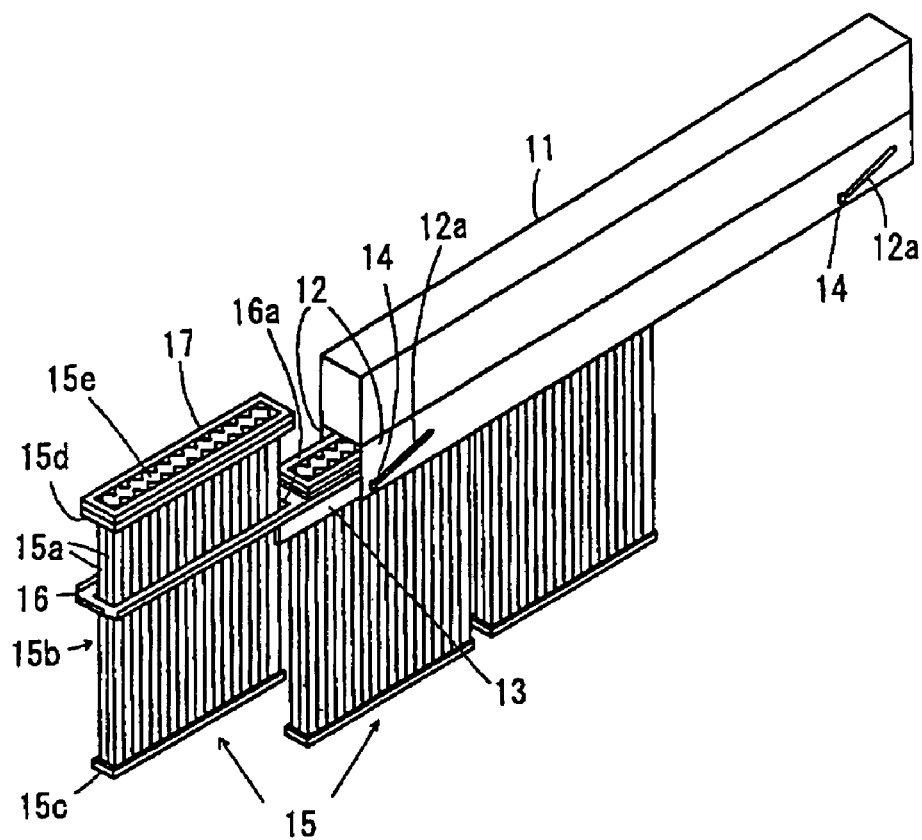
FIG. 7 is a perspective view of the second embodiment.
Figure 9:
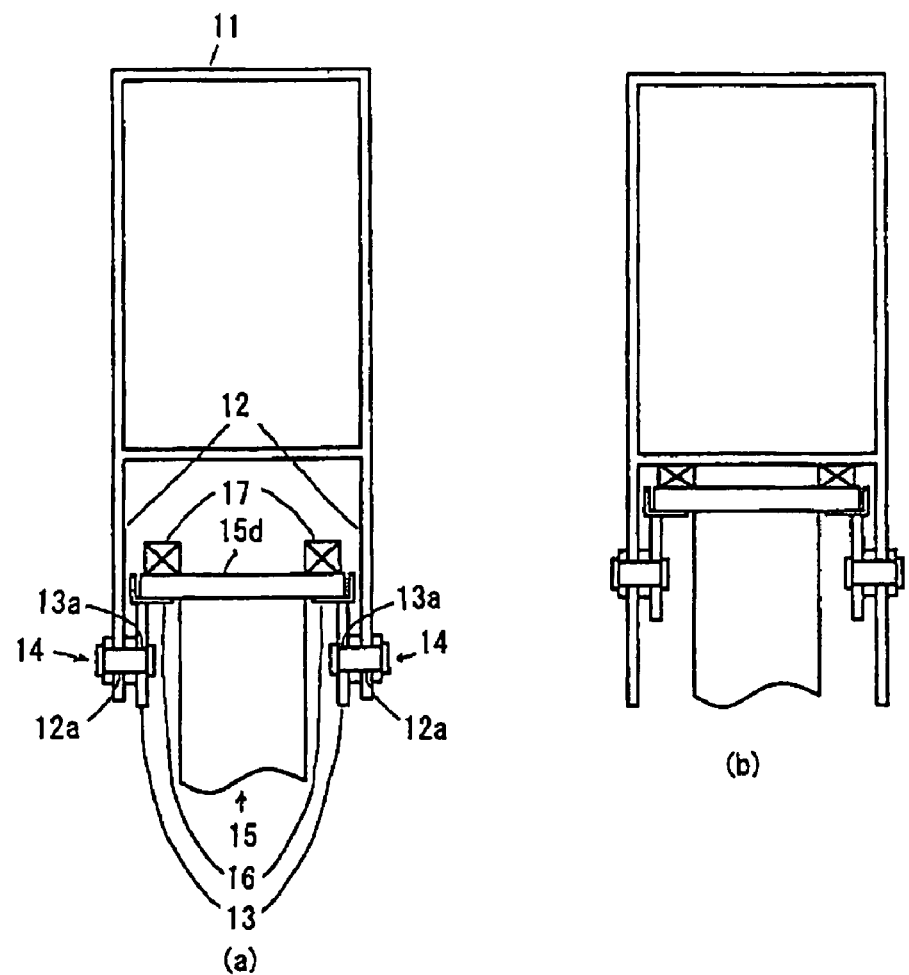
FIG. 9 is a longitudinal sectional view of the second embodiment, wherein (a) shows the figure before attaching the plate-type-cartridge element, and (b) shows the figure after attaching it.

Now, we discuss the second embodiment of the invention in detail. The embodiment uses a plate-type cartridge element 15 as a cartridge element based on drawings. As shown in FIG. 7, at the bottom of a duct 11 that is installed in a predetermined position in a dust collector, guiding members 12 are fixed at intervals and have more than one inclined elliptic hole 12*a*. Inside each guiding member 12, a drilled rail 13 that has connecting holes 13*a* that correspond to the inclined elliptic holes 12*a* is attached (see FIG. 9).

The guiding members 12 and the rails 13 are coupled by the coupling devices 14 that are inserted through the inclined elliptic holes 12*a* and the connecting holes 13*a*. The rails 13 have a sliding member 16, which has more than one opening 16*a* into which the plate-type cartridge elements 15 are to be inserted. More than one (in this embodiment, three) plate-type cartridge elements 15 are inserted in the openings 16*a* that are made on the sliding member 16. The plate-type cartridge elements 15 are supported by the rails 13 with the sliding member 16 and installed between the rails 13.

Now we discuss the plate-type cartridge element 15. In this embodiment, "plate-type" means substantially having the shape of a plane plate as a whole, and a "plate-type cartridge element" means a plate-type filter unit that can easily be attached and detached. We specifically discuss the plate-type cartridge element 15 of this embodiment as follows. The filter 15*b*, which is composed of two sheets of pleated filter medium 15*a* that are opposed to, and spaced apart from, each other, is closed at the lower end of it by a cap 15*c*. At the upper end of the filter 15*b*, a mounting material 15*d* that has an opening 15*e* is fixed. The plate-type cartridge element 15 comprises the filter 15*b*, the cap 15*c*, and the mounting material 15*d*. In this embodiment, "pleated" means having a configuration of which the cross section is in the shape of successive Vs. Any angle of each of the gradients of the two sides of every V-shape is acceptable. Both of them may be the same angle or one of them may be vertical.

The plate-type cartridge element 15 is installed so that the filter 15*b* can extend vertically, namely, so that the successive edges, which are shaped like ridges of the pleated filter medium 15*a*, appear to be vertical stripes. Further, on the upper part of the plate-type cartridge element 15 a packing adheres.

Now we discuss the operation of the device that is composed of the above. The rails 13 are horizontally pulled out until coupling devices 14 come to the lowest part of the inclined elliptic holes 12*a*. Then, the plate-type cartridge elements 15 are inserted in the openings 16*a* of the sliding member 16, inserted between the rails 13, and then supported by the rails 13 with the sliding member 16 (shown in FIG. 8*a*). Its longitudinal sectional view is shown in FIG. 9*a*.

Figure 8:
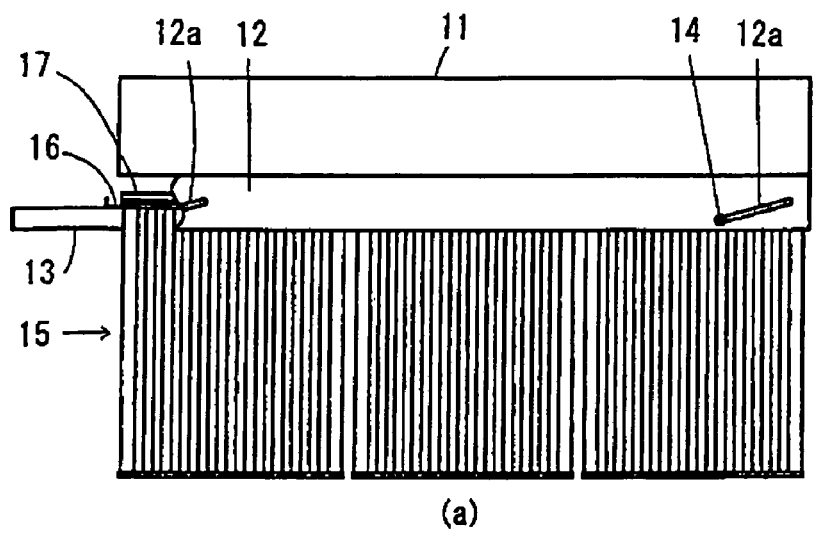
FIG. 8 is a front view of the second embodiment, wherein (a) shows the figure before attaching the plate-type-cartridge element, and (b) shows the figure after attaching it.
Figure 8:
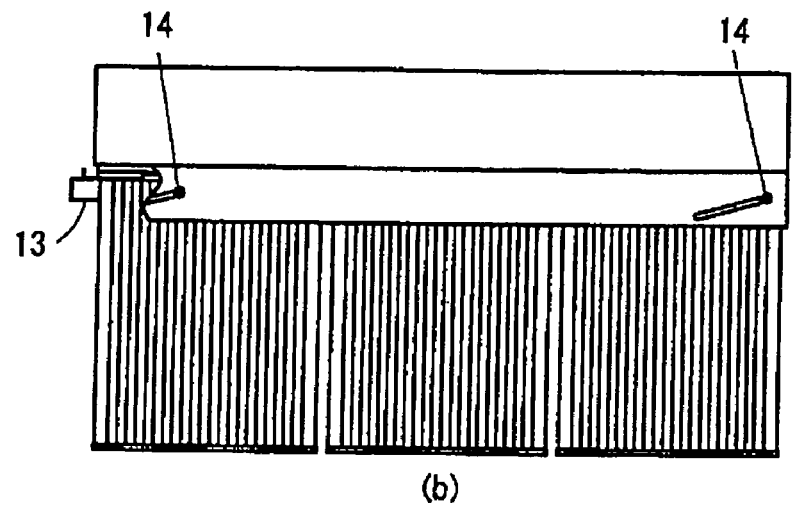

When the rails 13 are horizontally slid down, since the coupling devices 14 are moved along the inclined elliptic holes 12*a* to the highest part of the holes 12*a*, the rails 13 are lifted up with them. Accordingly, the plate-type cartridge elements 15 are lifted up and contact the lower side of the duct 11, as shown in FIG. 8*b*. Thus the attachment of the plate-type cartridge element 15 is achieved. Its longitudinal sectional view is shown in FIG. 9*b*.

When the plate-type cartridge element 15 should be detached, then, when the rails 13 are horizontally pulled out, since the coupling devices 14 are moved along the inclined elliptic holes 12*a* to the lowest part of the holes 12*a*, the rails 13 are lowered with them. Accordingly, the plate-type cartridge elements 15 are lowered and are detached from the duct 11, and thus detaching the plate-type cartridge elements 15 is achieved. When the plate-type cartridge element 15 should be changed, one may pull out the sliding member 16 and then change it.

Figure 10:
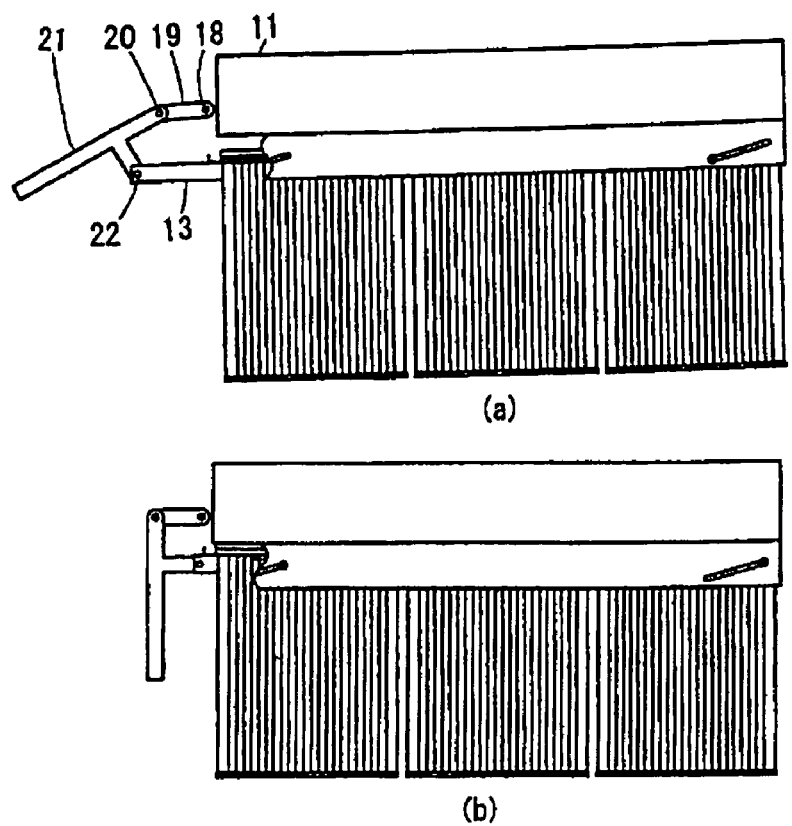
FIG. 10 is a front view of an example of a lever that horizontally moves the rails of the second embodiment, wherein (a) shows the figure before attaching the plate-type-cartridge element, and (b) shows the figure after attaching it.

The work for the horizontal movement of the rails 13 may be done according to the embodiment shown in FIG. 10. We discuss it as follows. The duct 11 has a link mechanism 19 that is connected to the duct 11 by a pin 18 and a lever 21 that is connected to the link mechanism 19 by a pin 22, and the lever 21 is connected to the rail 13 by a pin 22. The rails 13 are horizontally moved to the direction where it can be pulled out or slid down by rotating the lever 21 clockwise or counterclockwise. Thus, the horizontal movement of the rails 13 is made easier.

Figure 11:
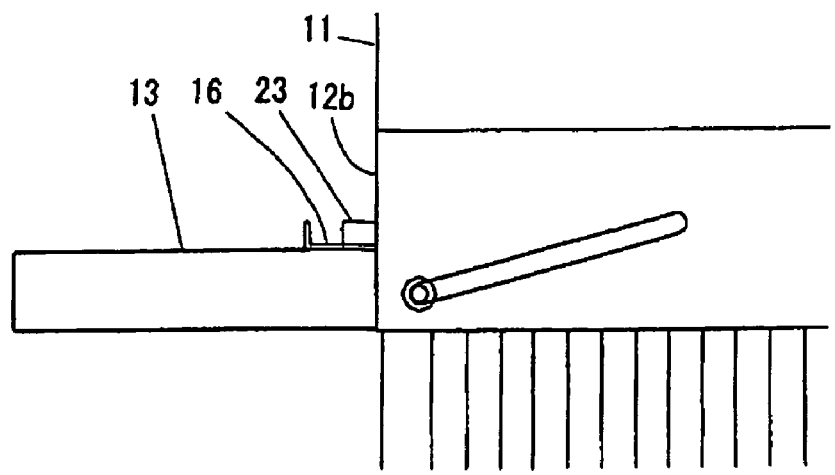
FIG. 11 is an enlarged front view of an example of a stopper that is mounted on the sliding member of the second embodiment, wherein (a) shows the figure before attaching the plate-type-cartridge element, and (b) shows the figure after attaching it.
Figure 11:
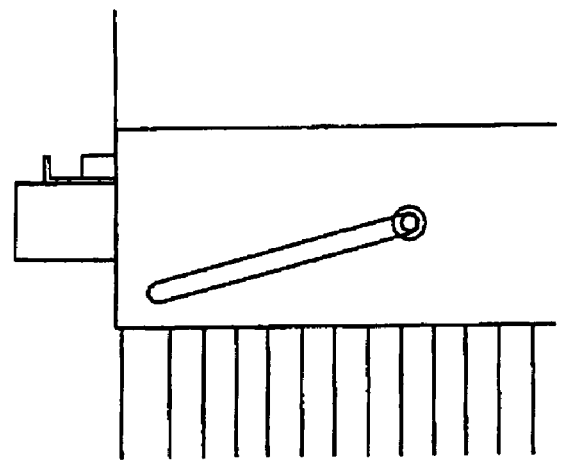

The horizontal displacement of the plate-type cartridge elements 15, which is generated when the rails 13 are horizontally moved to the direction for being slid down, is absorbed by making the opening of the bottom of the duct 11 smaller than the opening 15e of the filter 15b. Preferably, as shown in FIG. 11, a stopper 23 is fixed on the only end of a sliding member 16, and when the sliding member 16 is slid down between guiding members 12, the stopper 23 contacts the end plate 12b of the guiding members 12 and prevents the sliding member 16 from further horizontal movement. If under this configuration the rails 13 are horizontally moved to the direction for being slid down, the horizontal displacement of the plate-type cartridge elements 15 can be prevented.

The duct 11 and the plate-type cartridge elements 15 that are fixed on it are variably located in the dust collector. For example, they may be horizontal and spaced apart from each other, or they may be vertical and spaced apart from each other. Further, such an arrangement wherein the groups of the elements, which elements are horizontal and spaced apart from each other, are vertical and spaced apart from each other, is acceptable. When a duct forms a large space, the plate-type cartridge elements 15 can be fixed on the bottom of it in any arrangement.

The operation of the dust collector when it collects dust is as follows. The effect of suction works in the duct 11 by means of some suction means (e.g., a blower), which is not shown, and the air with dust goes from the outside of the filter 15b to the inside of it. During this period, the dust that has been in the air is removed because it adheres to the outer surface of the filter 15b. Then, the air that has entered the filter 15b exits its opening 15e and enters the inside of the duct 11, and then exits the dust collector through a chamber of clean gas, which is not shown.

By the conventional way, such cartridge elements are fixed by bolts, a concentrated load is applied to the bolts, and the packing is not uniformly pressed. In this embodiment, since the rails 13 can uniformly distribute the load to a packing 7, its airtightness is increased.

In this embodiment, a packing 17 adheres on the upper part of the plate-type cartridge element 15, but it may be omitted if the mounting material 15d of the plate-type cartridge element 15 is made of a material of which at least some part has sealing characteristics.

In this embodiment, the plate-type cartridge element 15 is supported by the rails 13 with a sliding member 16, but it may be directly supported by the rails 13 without the sliding member 16. In this case the mounting material 15d is mounted on the rails 13. However, if more than one plate-type cartridge element 15 is installed, it is preferable that they be inserted in the openings 16a of the sliding member 6 and then installed using the member 6, because they can be set in predetermined places when they are installed and can be quickly removed when it is so wanted.

Further, in this embodiment, a plate-type cartridge element 15 is used as a cartridge element. However, the cartridge element is not limited to this type. A cylindrical cartridge element may be used, for example. Since if a plate-type is used as the type of cartridge element, the rate of the use of the space by the cartridge element in the dust collector will be increased, and the structure of the dust collector will be compact. So the plate-type is preferable.

In this embodiment, since the cartridge elements are horizontally moved to the direction for being pulled out or slid down, they can be exchanged easily even though they are vertically arranged in rows. Since no vertical space for pulling them out or sliding them down is necessary, the height of the dust collector can be decreased, and accordingly the dust collector can be made compact even though the cartridge elements are arranged vertically in rows. Thus, this embodiment is more effective when the cartridge elements are vertically arranged with in rows.

C. The Third Embodiment of the Invention

Figure 14:
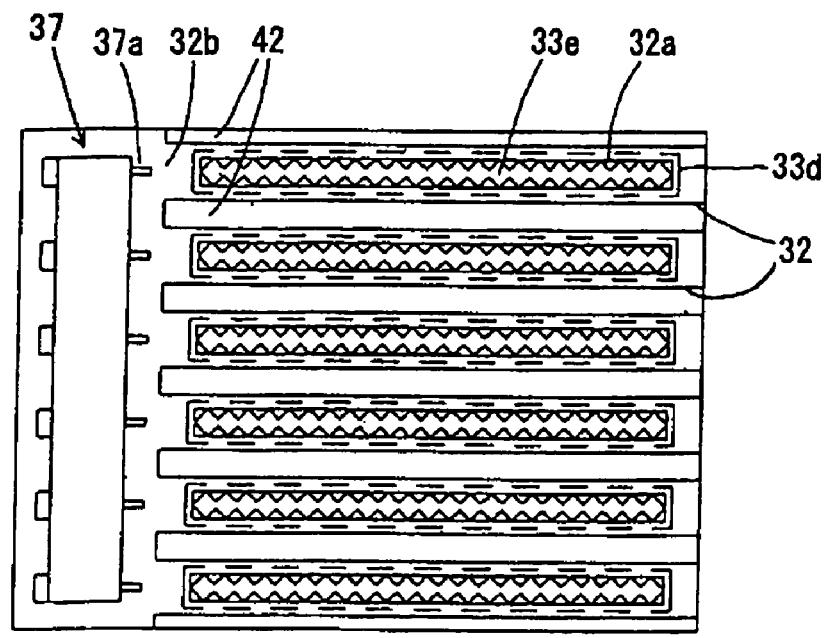
FIG. 14 is a sectional view cut along arrow B-B of FIG. 12.

Now, we discuss the third embodiment of the invention in detail based on the drawings. In reference to FIG. 12, on the upper part of each of the filtering chambers 31 that are stacked in a casing and form a number of rows (three rows in this embodiment) and that communicate with each other, a number of ducts 32 are installed. They are spaced apart from each other (see FIG. 14). In each filtering chamber 31, the plate-type cartridge elements are installed and each of them is attached under the duct 32 and is detachable.

Figure 15:
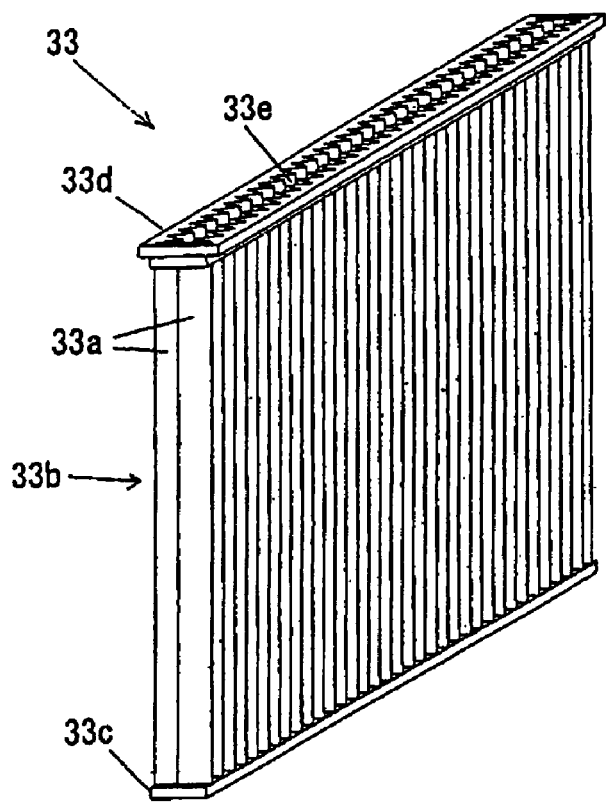
FIG. 15 is a detailed view of an example of the plate-type-cartridge element of the third embodiment.

Now, we discuss the plate-type cartridge element 33. In this embodiment, "plate-type" means substantially having the shape of a plane plate as a whole, and a "plate-type cartridge element" means a plate type filter unit that can be easily attached and detached. In reference to FIG. 15, we specifically discuss the plate-type cartridge element 33 of this embodiment as follows. A filter 33b, which is composed of two sheets of pleated filter medium 33a and 33b being opposed to, and spaced apart from, each other, is closed at one end (the lower end of it in this embodiment) by a cap 33c made of resin, and a mounting material 33d made of resin that has an opening 33e is fixed at the other end (the upper end of it in this embodiment). The plate-type cartridge element 33 comprises the filter 33b, the cap 33c, and the mounting material 33d. In this embodiment, "pleated" means being made with a configuration of which the cross section has the shape of successive Vs. The gradient of each of the two sides of every V-shape can have any angle. Both of them may be the same angle or one of them may be vertical.

The plate-type cartridge elements 33 are installed so that the filter 33b can extend vertically, namely, so that the successive edges shaped like ridges of the pleated, filter medium 33a appear to be vertical stripes. The plate-type cartridge elements 33 are fixed under the ducts 32 by the mounting materials 33d that are used as fixing means (not shown). The opening 32a that is made at the bottom of the duct 32 is covered by the mounting material 33d when the plate-type cartridge elements 33 are fixed. The duct 32 communicates with the inside of the filter 33b through the opening 32a.

Figure 12:
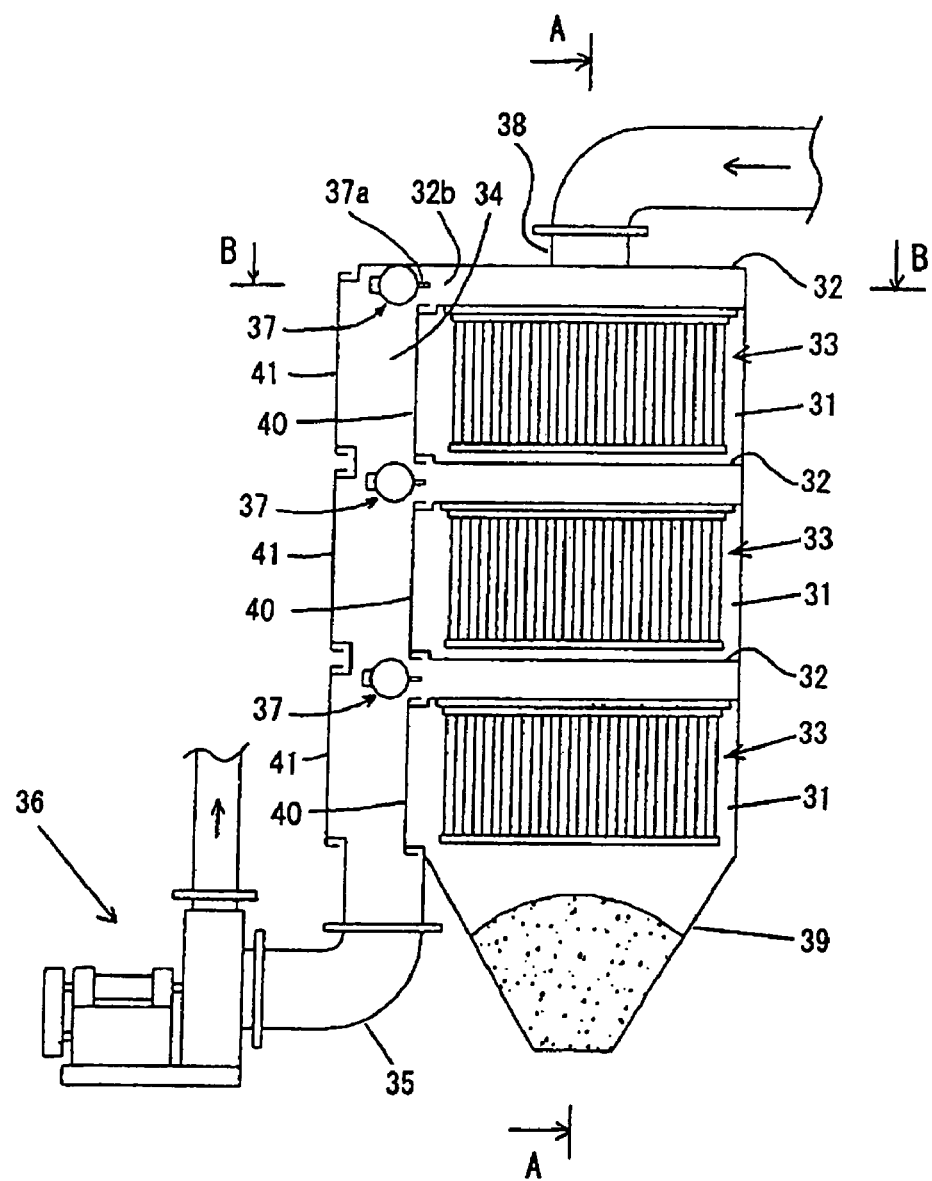
FIG. 12 is a front view (partially sectional view) of the third embodiment.
Figure 13:
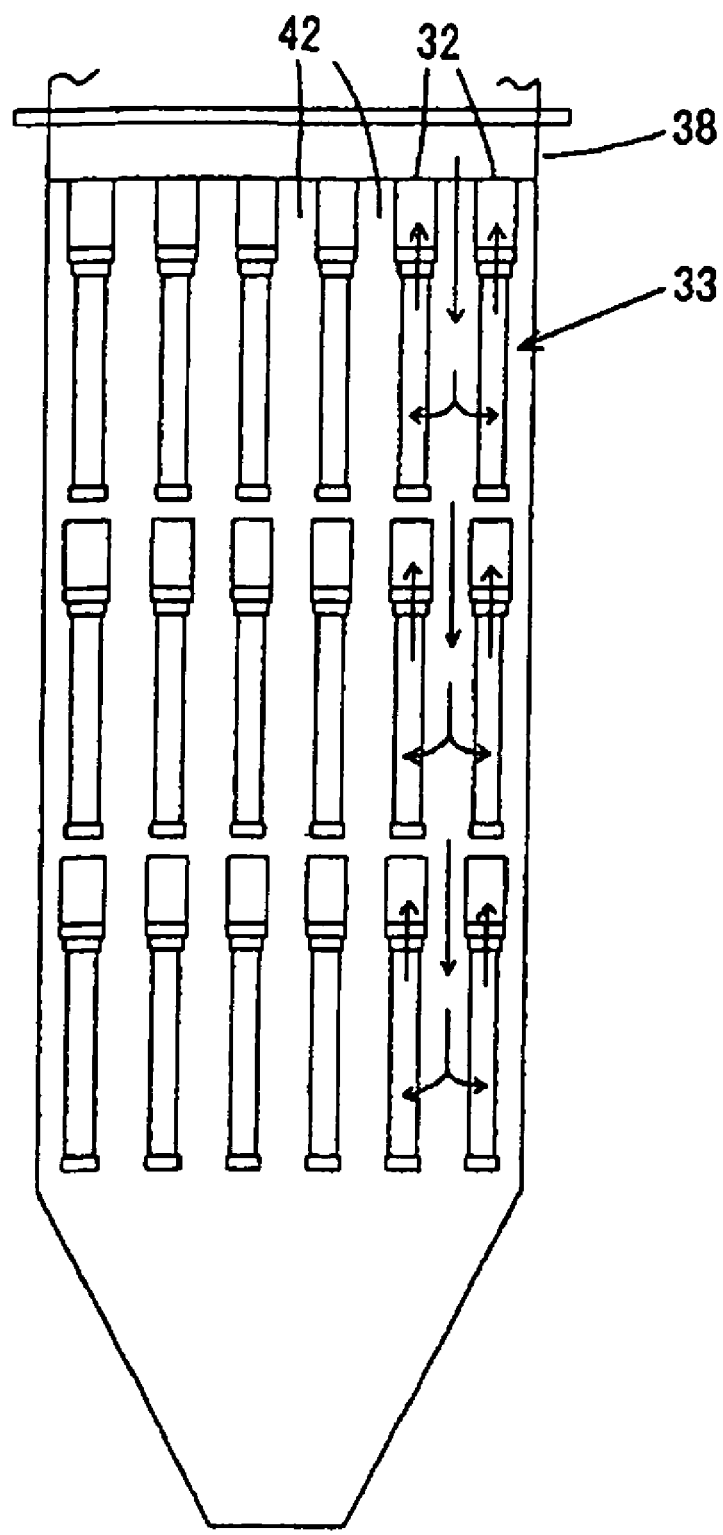
FIG. 13 is a sectional view cut along arrow A-A of FIG. 12.

As shown in FIG. 12, the duct 32 is closed at one end and the other end has an opening 32b. The duct 32 communicates with a purified-air chamber 34, which extends vertically in the casing, through the opening 32b and through a curved duct 35 that is located at the lower part of the purified-air chamber 34. The curved duct 35 communicates with a blower 36, which is an air-suctioning means. In the purified-air chamber 34, pulse-jet mechanisms 37 are furnished on more than one row (three rows in this embodiment), and each nozzle 37a of the pulse-jet mechanisms 37 is located facing the opening 32b of the duct 32.

There is an entrance 38 for air with dust that is located on the top of the duct 32. The entrance 38 communicates with the highest filtering chamber 31. There is a hopper 39 that is located at the bottom of the filtering chamber 31 to gather the dust and that is in communication with it. The part denoted by the symbol 40 is a detachable cover for maintenance. It also acts as a separator that segregates the filtering chamber 31 from the purified-air chamber 34. The part indicated by the symbol 41 is also a detachable cover. In this embodiment, since the detachable covers 40 and 41 can be detached and the plate-type cartridges 33 can be pulled out horizontally, the plate-type cartridge elements 33 can be exchanged easily even though they are arranged vertically in rows.

Now we discuss the operation of the device that is composed of the above. When the blower 36 is operated, because of its suction effect, the air with dust goes from the entrance 38 to the inside of the highest filtering chamber 31. Since two or more ducts 32 are located, and spaced apart from each other, there is more than one space 42 (see FIGS. 23 and 14) between the ducts 32. Since the filtering chambers 31 communicate with each other, the air with dust that has entered the entrance 38 is distributed to every filtering chamber 31.

Then, the air with dust that has come into the filtering chamber 31 goes from outside the filter 33b to the inside of it. During this period, the dust that has been in the air is removed by being caused to adhere to the outer surface of the filter 33b. Then, the air that has entered the inside of the filter 33b exits its opening 33e and enters the inside of the duct 32, and travels into the chamber of clean air 34. Then the air that has traveled into the chamber is aspirated by the blower 36, and then exits the dust collector.

During the above operations, since the quantity of the dust adhering to the outer surface of the filter 33b is increased, backwashes of the filter 33b are carried out as needed. In this embodiment, the backwash of the filter 33b means the dispersion of the dust that has adhered to the outer surface of the filter by admitting compressed air into the openings of the filter and letting it go through the filter from its inside to its outside so as to disperse the dust on the filter. As for the backwash of the filter 33b, compressed air blows out from the nozzles 37a of the pulse-jet mechanisms 37, and the air exits each duct 32 and enters the inside of the filter 33b from the opening 33e of it. In this way the backwash is intermittently carried out during the above operations.

The dust is dispersed from the surface of the filter 33b by the backwash of it, falls, and is gathered in a hopper 39. Then, the dust that is gathered in it is discharged into a container, as needed.

Figure 16:
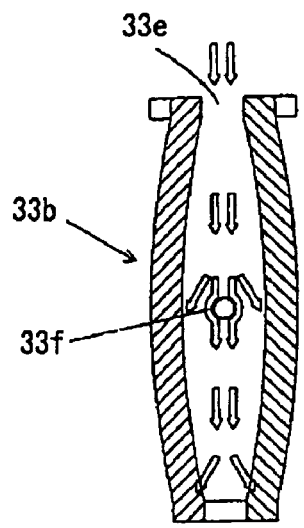
FIG. 16 is an explanatory drawing of an example of a transverse member installed in the filter of the third embodiment.
Figure 17:
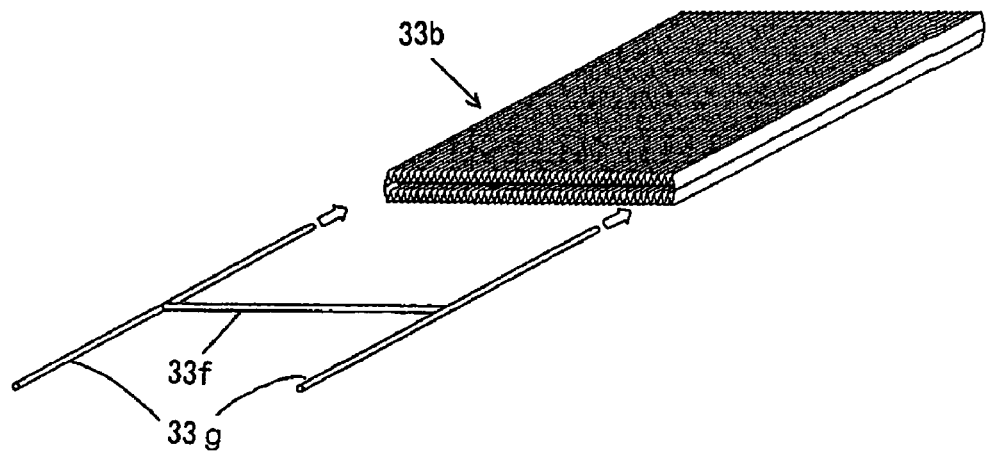
FIG. 17 is an explanatory drawing of an example of a transverse member installed in the filter of the third embodiment.

The plate-type cartridge element 33 may be an embodiment such as is shown as follows. As shown in FIG. 16, a transverse member 33f may be fixed in the filter 33b. In this embodiment, the transverse member 33f is located at a level that is about one-half the height of the filter 33b. In this case, since a collision of the compressed air with the transverse member 33f changes the direction of the air that is blown into the filter 33b during a backwash, the air is effectively dispersed by the transverse member (see FIG. 16). Since the transverse member 33f does not adhere to the filter 33b, the filter 33b is swollen during the backwash, and so the effect of the dispersing of the dust is increased. The way to put the transverse member 33f in the filter 33b is, for example, that a supporting member 33g is fixed to both ends of the transverse member 33f so as to make a member shaped like an H. Then that member shaped like an H is inserted in the filter 33b.

In this embodiment, the plate-type cartridge element 33 is installed so that the filter 33b can extend vertically, namely, so that the successive edges shaped like ridges of the pleated filter medium 33a appear to be vertical stripes. Therefore, the filter 33b extends in the same direction (vertically) as the air with dust flows (top to bottom i.e., vertically), and the dust that is dispersed from the outer surface of the filter 33b is not prevented from falling. Further, the dispersed dust does not tend to again adhere to the outer surface of the filter 33b. Accordingly, the efficiency of filtering can be increased.

Further, in this embodiment, since the air with dust flows from top to bottom, the dust that is dispersed from the outer surface of the filter 33b does not fly up or adhere again to its surface.

In this embodiment, since the plate-type is used as the type of cartridge, the rate of the use of the space by the cartridge element in the dust collector will be increased. Also, its filtration area is greater than that of a conventional dust collector with the same capacity. Further, the structure of the dust collector is compact.

Further, in this embodiment, the pleated planate filter 33b can increase the area to trap dust. It can also increase the efficiency to disperse dust that adheres on the outer surface of the filter 33b, because the pleats of it are alternately expanded and contracted.

D. The Fourth Embodiment of the Invention

Now based on the drawings we discuss in detail the embodiment that uses a plate-type cartridge element 53 as a cartridge element. As in FIG. 18, hollow ducts 52, in each of which one end is closed and the other end of which has an opening 52a, are horizontally installed and spaced apart from each other (see FIG. 19) at the upper side of a filtering chamber 51. More than one plate-type cartridge element 53 is installed in the filtering chamber 51. The plate-type cartridge elements 53 are attached on the bottom of the ducts 52 so that they can easily be attached and detached.

Figure 20:
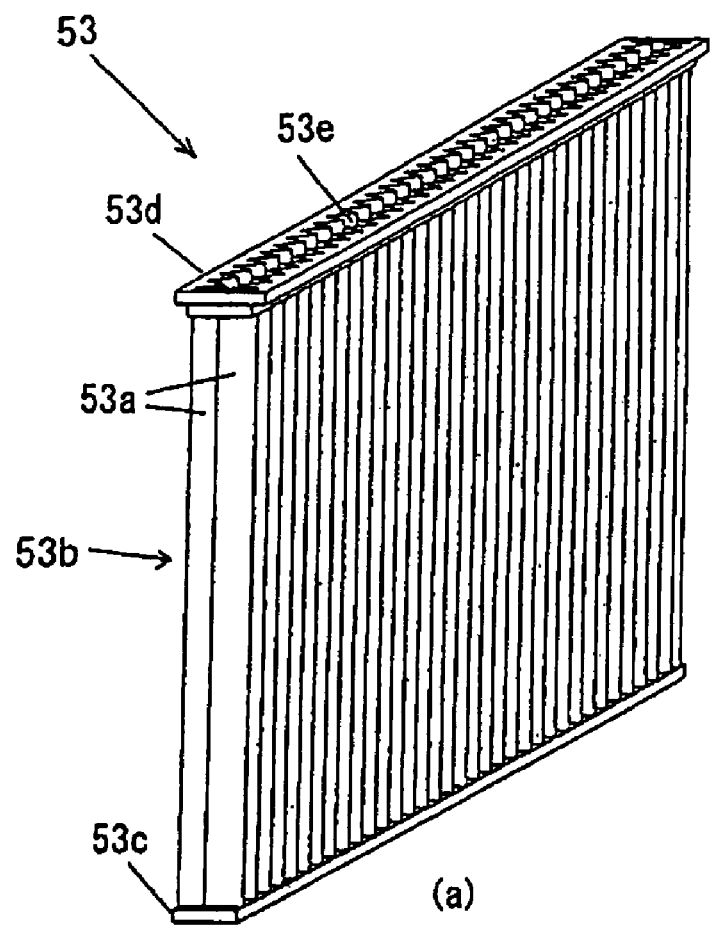
FIG. 20a is an explanatory drawing of an example of the plate-type-cartridge, element of the fourth embodiment.
FIG. 20b is a top view of the plate-type-cartridge element of the fourth embodiment.
Figure 20:
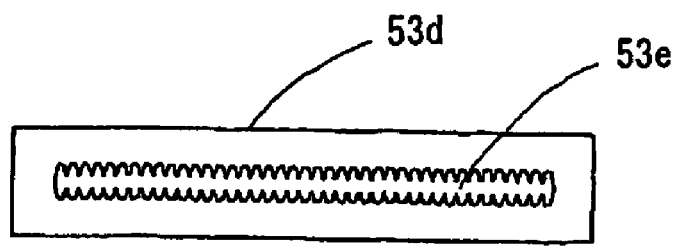

Now we discuss the plate-type cartridge element 53. In this embodiment, "plate-type" means substantially having the shape of a plane plate as a whole, and a "plate-type cartridge element" means a plate-type filter unit that can easily be attached and detached. We specifically discuss the plate-type cartridge element 53 of this embodiment as follows, referring to FIG. 20. The filter 53b, which is composed of two sheets of pleated filter medium 53a being opposed to, and spaced apart from, each other is closed by a cap 53c at one end (the lower end in FIG. 20), and mounting material 53d that has an opening 53e is fixed at the other end (the upper end in FIG. 20). The plate-type cartridge element 53 comprises the filter 53b, the cap 53c, and the mounting material 53d. As the width of the opening at the end of the filter 53 narrows, the filter 53 becomes stronger and has a longer life span.

"Pleated" of this embodiment means being made with a configuration of which the cross section is in the shape of successive Vs. Any angle of the gradients of the two sides of every V-shape is acceptable. Both of them may be the same angle or one of them may be vertical. The pleated planate filter 53b can increase the area to trap dust. It can also increase the efficiency to disperse the dust that adheres to the filter 53b, because its pleats alternately expand and contract.

The plate-type cartridge element 53 is installed so that the filter 53b can extend vertically, namely, so that the successive edges shaped like ridges of the pleated filter medium 53a appear to be vertical stripes. Further, the mounting material 53d of the plate-type cartridge element 53 is fixed on the bottom of the duct 52 by fixing means (not shown). The opening 52b (see FIG. 19) that is made at the bottom of the duct 52 is covered by the mounting materials 53d when the plate-type cartridge element 53 is fixed. The duct 52 communicates with the inside of the filter 53b through the opening 53e of the filter 53b.

Figure 18:
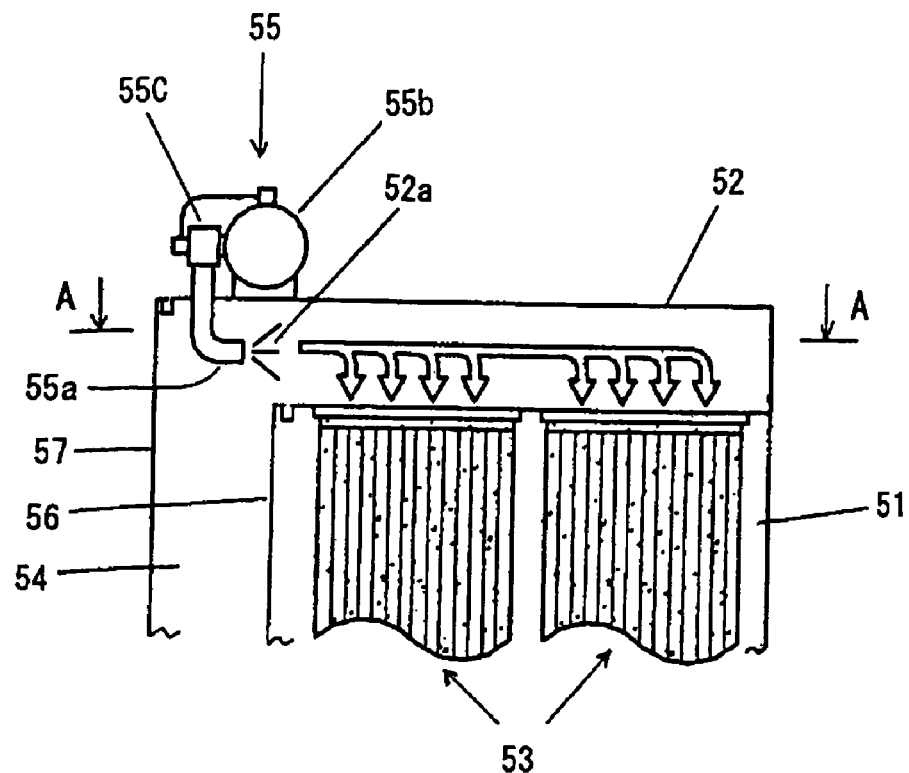
FIG. 18 is a partially sectional view of the fourth embodiment of the invention.
Figure 19:
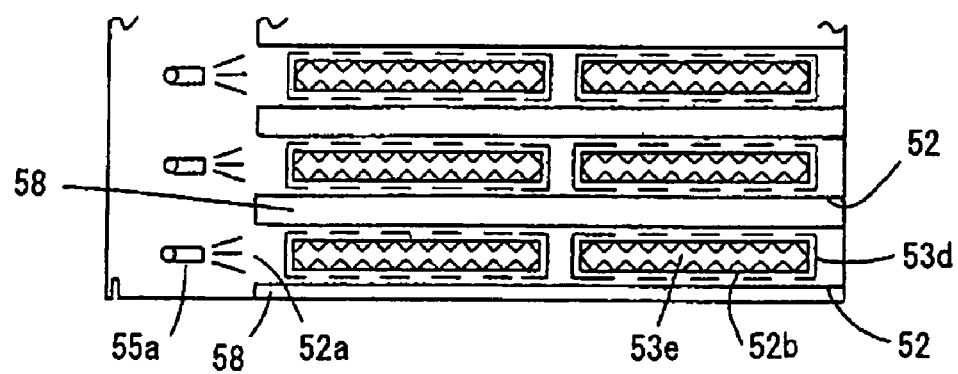
FIG. 19 is a partially sectional view cut along arrow A-A of FIG. 18.

As shown in FIG. 18, the duct 52 communicates with a purified-air chamber 54, which extends vertically through the opening 52a. At the upper part of the purified-air chamber 54, pulse-jet mechanisms 55 are provided, and each nozzle 55a of each pulse-jet mechanism 55 intermittently feeds compressed air inside the filter 53b. Each pulse-jet mechanism 55 comprises an air tank 55b, air valves 55c that communicate with the air tank 55b, and air jet nozzles 55a that communicate with the air valves 55c, wherein the number of the air valves 55c is the same as that of the ducts 52, and so is the number of the air jet nozzles 55a. The tip of each air jet nozzle 55a is inserted into the purified-air chamber 54 and located facing the opening 52b of each duct 52.

The part, indicated by the symbol 56 is a detachable cover for maintenance. It also acts as a separator that segregates the filtering chamber 51 from the purified-air chamber 54. The part indicated by the symbol 57 is also a detachable cover. Since two or more ducts 52 are horizontally located and spaced apart from each other, there is more than one space 58 (see FIG. 19) between the ducts 52, and the spaces 58 communicate with the entrance of the air with the dust.

Now we discuss the operation of the above construction. Because of an effect of the suction of a suction means (e.g., a blower), which is not shown, which suction communicates with the purified-air chamber 54, the air with dust enters the inside of the filtering chamber 51 through the entrance, which is not shown, and the spaces 58. Then, the air with dust, which has entered the filtering chamber 51, goes from the outside the filter 53b to the inside of it. During this period, the dust that has been in the air is removed by being caused to adhere to the outer surface of the filter 53b. Then, the air that has entered the inside of the filter 53b exits its opening 53e and enters each duct 52, and then exits its opening and enters. the purified-air chamber 54. Then, the air that has entered the purified-air chamber 54 is aspirated by suction means, which is not shown, and exits the dust collector.

During the above operations, since the quantity of the dust adhering to the outer surface of the filter 53b increases, the backwashes of the filter 53b are carried out as needed. In this embodiment, the backwash of the filter means disperses the dust that adheres to the outer surface of the filter by admitting compressed air from the openings of the filter and letting it go through the filter from its inside to its outside so as to disperse the dust on the filter. As for the backwash of the filter 53b, when air valves 55c that communicate with the air tank 55b of the pulse jet mechanism 55 are opened, compressed air blows out from the respective nozzles 55a that communicate with the air valves 55c, and the air goes through each duct 52 and enters the filter 53b from the opening 53e of it. In this way the backwash of the filter 53b is carried out intermittently during the above operations.

The dust that is dispersed from the outer surface of the filter 53b by the backwash of it falls and is gathered in a hopper, which is not shown. Then, the dust that is gathered in it is discharged into a container, which is not shown, as needed.

Figure 21:
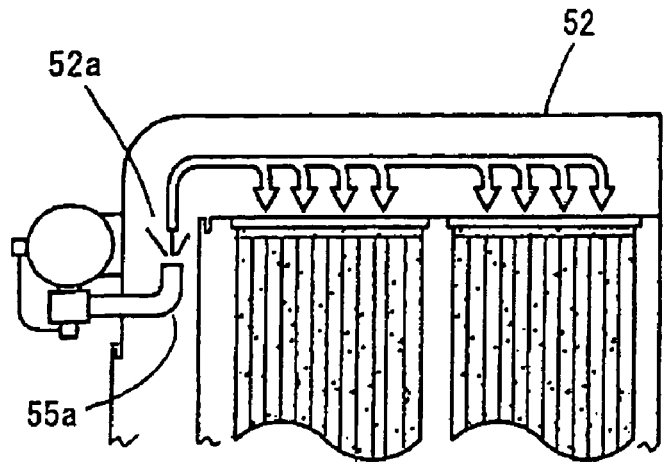
FIG. 21a is a front view (a partially sectional view) of another example of the plate-type-cartridge element of the fourth embodiment.
FIG. 21b is a front view (a partially sectional view) of another example of the plate-type-cartridge element of the fourth embodiment.
Figure 21:
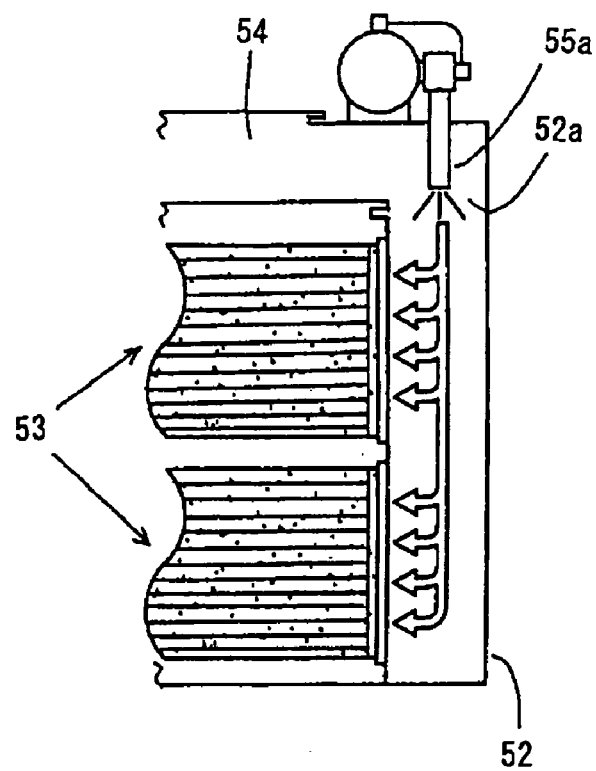

Based on FIG. 21 now we discuss an embodiment in which the layout of the devices is modified. The embodiment shown in FIG. 21a is an example of a layout in which one end of the duct 52 is bent 90 degrees and the opening 52a of it is directed downward. The tip of the air jet nozzle 55a faces the opening 52a. The embodiment. shown in FIG. 21b is an example of a layout in which the duct 52 can extend vertically and the purified-air chamber 54 can extend horizontally. In this layout, the tip of the air jet nozzle 55a faces the opening 62a of the duct fit, and the plate-type cartridge element 53 can horizontally extend, that is, it is arranged so that the successive edges shaped like ridges of the pleated filter medium 53 appear to be horizontal stripes.

In this embodiment, a plate-type cartridge element 53 is used as a cartridge element. However, the cartridge element is not limited to this type. A cylindrical cartridge element may be used, for example. Since if a plate-type is used as the type of cartridge element, the rate of the use of the space by the cartridge element and its filtration area in the dust collector will be increased and the structure of the dust collector will be compact, the plate-type is preferable.

Further, in this embodiment, since each nozzle 55a of the pulse-jet-mechanisms 55 intermittently feeds compressed air inside the filter 3b, it is not necessary to locate the air jet nozzles 55a just above each cartridge element, and the length of the air piping from the air jet nozzles 55a to the air valve 55c can be made short. Accordingly, since the loss of the pressure caused by the resistance of the air piping is considerably decreased, the drop of the discharge pressure of the pulse-jet air can be restrained and the cost of construction can be driven down. Since the filter medium can be exchanged by detaching the covers for maintenance 56 and 57, and the air piping need not be removed, the filter medium can effectively and quickly be exchanged. Further, the air piping can be firmly fixed.

INDUSTRIAL APPLICABILITY

This invention applies to dust collection of air at normal temperatures, such as a dust collector for an installation site for shot blasting or a working space of a foundry. It may apply to a cartridge element of a dust collector of which the air volume is 600 $m^3$/Hr-72000 $m^3$/Hr. Especially, since a dust collector for shot blasting needs a greater filtration area than that of a dust collector for another use that has the same disposal capacity, it can be more compact.

What is claimed:
1. A dust collector comprising:
a casing;
an air entrance in the casing for introducing a flow of air containing dust to be collected;
an exit in the casing for discharging filtered air;
a plurality of filtering chambers stacked vertically in the casing that communicate with each other and the entrance;
a plurality of ducts fixed to an upper part of each of the filtering chambers and the ducts are spaced apart horizontally from each other in each filtering chamber;
a planar cartridge element detachably mounted to each duct, each cartridge element including a filter composed of two sheets of pleated filter material that are opposed to and spaced apart from each other to form an inner space therebetween, said pleated sheets having a cross section of successive V's with a ridge at an apex of the V's that extends vertically on an outer surface thereof when the cartridge element is mounted to the duct, the filter being closed at a lower end and open at an upper end that communicates the inner space of the filter with the duct through the open end of the filter when the cartridge element is mounted to the duct;
a filtered air chamber in the casing that communicates with the ducts;
an air-suctioning means that communicates with the filtered air chamber and with the exit for discharging filtered air;
wherein activation of the air-suctioning means introduces a flow of air containing dust through the entrance of the casing and into the stacked filtering chambers, through the filters of each cartridge element from the outer surface to the inner space thereof, dust in the air adhering to the outer surface of the filters, from the inner space of the filters through the open ends thereof and the ducts to the filtered air chamber and out the exit for filtered air; and a pulse-jet mechanism that communicates with the ducts for intermittently feeding compressed air to the inner space of the filters through the ducts and the open ends of the filters to backwash the filters and dislodge dust from the outer surfaces thereof.

2. The dust collector of claim 1, wherein a transverse member is inserted in the inner space of each filter that disperses the compressed air fed to the space to disperse the dust on the outer surfaces of the filters when the filters are being backwashed.

3. The dust collector of claim 1, wherein the entrance is located in an upper part of the casing and communicates with the highest of the vertically stacked filtering chambers so that the flow of air containing dust flows successively into the stacked chambers from the highest to the lowest filtering chamber, the planar cartridge elements being mounted under each duct, and a hopper is located in a lower part of the casing that communicates with the lowest filtering chamber for collecting dust dislodged from the filters.

* * * * *